United States Patent Office 3,751,396
Patented Aug. 7, 1973

3,751,396
REINFORCED POLYALKYLENE TEREPHTHALATE MOLDING RESIN HAVING REDUCED BURNING PROPERTIES IN THIN SECTIONS
John S. Gall, North Haledon, N.J., assignor to Celanese Corporation, New York, N.Y.
No Drawing. Continuation-in-part of application Ser. No. 46,823, June 16, 1970. This application Nov. 27, 1970, Ser. No. 93,511
Int. Cl. C08g 51/04
U.S. Cl. 260—40 R
24 Claims

ABSTRACT OF THE DISCLOSURE

Improved product for eliminating dripping of flaming particles during burning of articles less than about ⅛ inch in thickness and molded from an intimate blend of polypropylene terephthalate or polybutylene terephthalate, a reinforcing agent, wherein the reinforcing agent comprises particles having a length to diameter ratio of less than about 50:1, an aromatic halide and a group Vb metal containing compound. Dripping of flaming particles is eliminated by incorporating into the intimate blend of supplementary reinforcing agent having a length to diameter ratio of greater than about 50:1.

BACKGROUND OF THE INVENTION

The present invention is a continuation-in-part of copending application Ser. No. 46,823 filed June 16, 1970, assigned to the assignee herein.

Recent investigations with reinforced polypropylene terephthalate and polybutylene terephthalate molding resins have found them to be surprisingly superior to similarly reinforced polyethylene terephthalate in many important processing and performance characteristics. For example, polypropylene terephthalate and polybutylene terephthalate can be molded and processed at lower temperatures, have a shorter cycle time in the mold and do not require, as does polyethylene terephthalate, the presence of either a nucleating agent or an internal mold release agent. Furthermore, reinforced polypropylene terephthalate and polybutylene terephthalate molding resins have correspondingly higher tensile strength, lower water absorption and better creep (flexural) properties than does similarly reinforced polyethylene terephthalate. As a direct result, these polypropylene terephthalate and polybutylene terephthalate molding resins which were first disclosed, along with polyethylene terephthalate in U.S. Pat. 2,465,319 to Whinfield and Dickson, have been found to solve processing problems long associated with polyethylene terephthalate and believed, by those skilled in the art, to be equally associated with all polyalkylene terephthalates. Equally as significant these molding resins present a noticeably improved balance of performance properties which those skilled in the art, witness the extensive use of polyethylene terephthalate molding resins to the almost total exclusion of other polyalkylene terephthalates, did not believe to exist. Consequently, the superior processing requirements and physical properties of polypropylene terephthalate and polybutylene terephthalate molding resins makes them more commercially desirable, with a wider area of applicability than polyethylene terephthalate.

These molding resins do, however, have one considerable drawback—they are flammable. Quite significantly, the presence of many important reinforcing agents, such as glass, enhances rather than deters the burning rate of these molding resins. Since the reinforcing agents have a direct effect on the desirable physical—mechanical properties of these molding resins, several commercially advantageous applications are precluded.

Copending, application; Ser. No. 46,823, discloses a product and process for reducing the burning properties of an intimate blend of polypropylene terephthalate or polybutylene terephthalate and a reinforcing agent. It accomplishes this result by incorporating into the blend the combination of an aromatic halide and a group Vb metal containing compound. In its preferred embodiment the aromatic halide is present from about 3.3 to about 16 weight percent, based on the weight of the resin, calculated as halide, and the group Vb metal containing compound is present from about 0.7 to about 10.0 weight percent, based on the weight of the resin, calculated as the group Vb metal; in addition, the weight ratio of available halide in the aromatic halide to available group Vb metal in the group Vb metal containing compound is in the range of from greater than about 0.3 to less than about 4. The most preferred embodiments confine this latter range to from about 0.46 to about 2.0.

It has been found that this combination of additives when incorporated into an intimate blend of polypropylene terephthalate or polybutylene terephthalate and a reinforcing agent will, the great majority of instances, both significantly reduce burning and burn-induced dripping of articles molded thereof. In point of fact, a compilation of test results appearing in the above cited application shows a reduction in burn rate from 2.3 inches per minute with dripping for a polybutylene terephthalate—30 percent glass reinforced control sample to less than 1.1 inches per minute without dripping for a series of polybutylene terephthalate—30 percent glass reinforced samples containing various levels of aromatic halide and group Vb metal containing compound within the preferred halide to group Vb metal ratio range.

It has been found, however, that on certain isolated occasions, particularly when relatively thin articles or sections of articles, molded according to the teachings of the above application, are subjected to burn tests, in a manner to be more fully described hereinafter, the burn rate will be reduced but there still will be noticeable dripping. These isolated situations for relatively thin articles became predominant situations when the samples were aged prior to burn-testing. Subsequent investigation has found that two sets of conditions must be both present for these molded articles to drip notwithstanding the presence of the aromatic halide and group Vb metal containing compound. First, the articles, or sections of articles, must have a thickness less than about ⅛ inch. Second, the particle size of the reinforcing agent, as present in the molded article, must have a length to diameter ratio of less than about 50:1.

SUMMARY OF THE INVENTION

The present invention is directed to overcoming these problems and providing, in a manner to be more fully described hereinafter, a molding resin comprising an intimate blend of polypropylene terephthalate or polybutylene terephthalate and a reinforcing agent that, even though molded into articles less than about ⅛ inch in thickness and having a reinforcing agent particle size, as present in the molded article, with a length to diameter ratio of less than about 50:1 will not drip upon burning. More particularly, the present invention overcomes these problems by incorporating into the above intimate blend, in addition to the aromatic halide and group Vb metal containing compound, a supplementary reinforcing agent having a length to diameter ratio greater than about 50:1. In its preferred form, the present invention contemplates adding to the intimate blend of polypropylene terephthalate or polybutylene terephthalate, reinforcing filler, aromatic halide and group V*b* metal containing compound, in the amounts and ratios defined above, at least 0.75 weight percent of a supplementary reinforcing agent, most preferably a whisker material, having a length to diameter ratio of greater than about 100:1 and less than about 5000:1 and a maximum diameter of about .002 inch.

DETAILED DESCRIPTION OF THE INVENTION

The base of the molding resins of this invention is a polyalkylene terephthalate polymer selected from the group consisting of polypropylene terephthalate and polybutylene terephthalate. These polymers which are of the general type described in U.S. Pat. 2,465,319 to Whinfield and Dickson, can be produced from the reaction product of a dibasic acid, such as terephthalic acid or dialkyl ester terephthalic acid (especially dimethyl terephthalate), and diols having 3 and 4 carbon atoms. Suitable diols include 1,3-propanediol, 1,2-propanediol, 1,4-butanediol, 1,3-butanediol, 1,2-butanediol, 2,3-butanediol, and the like.

In the production of the polymers used in this invention, i.e., polypropylene or polybutylene terephthalate, the appropriate bis(hydroxyalkyl) terephthalate is produced as the intermediate. The bis(hydroxyalkyl) terephthalate can be prepared by reacting the dialkyl ester of terephthalic acid which the alkyl radicals can contain from 1 to 7 carbon atoms with about two molecular proportions of the diols described above. It is preferred to use higher proportions of the diol, i.e., in excess of 1.5 moles of the diol per mole of the terephthalate derivative, since by using such proportions, the initial transesterification is caused to take place more rapidly and completely.

The reaction for the esterification is conducted under conditions of elevated temperatures and atmospheric, subatmospheric or superatmospheric pressure. Normally, the desired temperatures of the reaction can range from about the boiling temperature of the reaction mixture to as high as 250° C., if desired. The range of intrinsic viscosity of the polypropylene terephthalate and polybutylene terephthalate should be between about 0.2 to about 1.2 deciliters per gram with the preferred range being about 0.5 to about 1.0 deciliter per gram.

After the polymer base is prepared, the reinforcing agents can be intimately blended by either dry blending or melt blending, blended in extruders, heated rolls or other types of mixers. If desired, the reinforcing agents can be blended with the monomers in the polymerization reaction as long as the polymerization reaction is not effected. Alternatively, the reinforcing agent can be added after polymerization and prior to extrusion. The types of reinforcing agents which can be used include among others glass fibers (chopped or continuous rovings) asbestos fibers, cellulosic fibers, cotton fabric paper, synthetic fibers, metallic powders and the like; with the preferred reinforcing agent being glass fibers. The amount of reinforcing agent can range from about 2 to about 60 weight percent, preferably from about 5 to about 40 weight percent based on the total molding composition. Other additives for appearance and property improvements can be incorporated into the molding resins of this invention such as colorants, plasticizers, stabilizers, hardeners and the like.

Glass reinforced polybutylene terephthalate and polypropylene resins have important advantages over the equivalent glass reinforced polyethylene terephthalate. Compared to polyethylene terephthalate, polybutylene terephthalate and polypropylene terephthalate can be processed at much lower temperatures, at a significantly lower cycle time with a lower mold temperature and they do not require either a nucleating agent or an internal, i.e., incorporated as an integral part of the composition, mold release agent. In addition they have noticeably higher notched izod and tensile impact, less shrinkage and lower water absorption than does polyethylene terephthalate. All of these improved processing and physical characteristics of the glass reinforced polybutylene terephthalate and polypropylene terephthalate resins are highly desirable having direct commercial ramifications, when compared to equivalent glass reinforced polyethylene terephthalate resin.

These reinforced polypropylene terephthalate and polybutylene terephthalate molding resins do, however, have one deleterious property—they are flammable and, when burning, drip a significant quantity of flaming particles. In the hereinafter described burn test, 30 weight percent glass reinforced polybutylene terephthalate is found to burn at a rate of 2.3 inches per minute with considerable dripping of flaming particles; polypropylene terephthalate burns at a similar rate and also drips flaming particles. To those skilled in the art this is an unacceptable and unsafe condition, resulting in curtailed application for these otherwise highly desirable materials.

The test procedure used involves supporting, at one end, a specimen 6 inches in length by ½ inch in width in either 1/16 inch or 1/8 inch thickness, by a clamp, with the longest dimension being vertical. Surgical cotton wadding is placed 12 inches below the suspended sample to test for dripping of flaming particles. A Bunsen burner flame, having a 3/8 inch diameter tube and a blue flame 3/4 inch in height is placed under the suspended sample so that the bottom of the sample is 3/8 inch above the top of the burner tube. The test flame is allowed to remain for 10 seconds, withdrawn, and if the duration of flaming or glowing combustion of the specimen ceases within 30 seconds after removal of the test flame, it is again placed under the specimen for 10 seconds immediately after flaming or glowing combustion of specimen stops. The burn rate is calculated as the number of inches consumed by both the Bunsen flame and self-combustion during one minute. According to the present description a reinforced polypropylene terephthalate or polybutylene terephthalate is considered to have reduced burning properties if, during the above combustion conditions, the burn rate is less than 1.1 inches per minute and no dripping of flaming particles occurs.

Co-pending application, Ser. No. 46,823, addresses itself to the problem of the flammability of an intimate blend of polypropylene terephthalate or polybutylene terephthalate with reinforcing agents. As disclosed therein, it was found that aromatic halides when used in conjunction with a Group V*b* (as taken from the Periodic Table of the Elements found in Advanced Inorganic Chemistry by Cotton and Wilkerson, Interscience Publishers, 1962) metal containing compound, effectively reduced the burning properties of reinforced polypropylene terephthalate and polybutylene terephthalate. In the most preferred embodiments described therein, the aromatic halides and Group V*b* metal containing compound placed these polyalkylene terephthalates in the category of self-extinguishing resins. In the context of the present description, a material is considered self-extinguishing if, according to the above test it does not continue to burn for greater than 30 seconds once the Bunsen flame is removed.

The specific aromatic halides found appropriate therein were selected from the following groups:

(I)

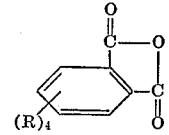

wherein R represents: hydrogen, chlorine, bromine, with at least one, preferably at least two chlorines or at least two bromines. For example, tetrabromophthalic anhydride and tetrachlorophthalic anhydride, and the like. Or, (II) 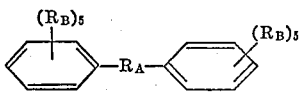

wherein $R_A$ represents: oxygen, sulfur, sulfur dioxide, methylene, phosphonates; wherein each $R_B$ represents: hydrogen, chlorine, bromine, with at least one, preferably at least two chlorines or at least two bromines.

For example 3,5,3',5'-tetrabromobiphenyl ether or 3,5,3',5'-tetrachlorobiphenyl sulfide or 3,5-dichloro-3',5'-dibromo biphenylsulfoxide or 2,4-dichloro-3',4',5'-tribromobiphenylmethane or decabromobiphenyl ether and the like.

(III) 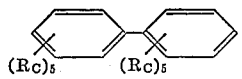

wherein each $R_C$ represents: hydrogen, chlorine, bromine with at least one, preferably at least two chlorines or at least two bromines.

For example, 2,2',4,4',6,6' hexachlorobiphenyl or 2,2',4,4',6,6' hexabromobiphenyl, and the like.

(IV) 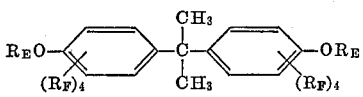

wherein each $R_E$ represents: hydrogen, acetate, methyl wherein each $R_F$ represents: hydrogen, chlorine, bromine, with at least one, preferably at least two chlorines or at least two bromines.

For example, 2,2-bis(3,5-dibromo 4-hydroxyphenyl) propane, 2,2-bis(3,5-dichloro 4-acetoxyphenyl) propane, 2,2-bis(3,5-dichloro 4-methoxyphenyl) propane and the like.

Group Vb compounds found suitable therein were compounds containing phosphorus, arsenic, antimony or bismuth. Most particularly, the compounds selected from the oxides of these Group Vb metals, with the preferred embodiment being antimony trioxide.

The aromatic halide and Group Vb metal containing compound may be incorporated in the molding resins of the present invention in any standard manner. It is preferred, however, that they be added during the polymerization reaction and, prior to the introduction of the reinforcing agent.

As stated this unique combination of an aromatic halide and a Group Vb metal containing compound, when present in the desired weight percents and relative weight ratios, has been found to be very effective in reducing the burning properties of reinforced polypropylene terephthalate and polybutylene terephthalate. A compilation of test results, appearing in the above cited co-pending application demonstrates this efficiency by showing a reduction in the burn rate from 2.3 inches per minute with dripping for a polybutylene terephthalate—30 percent glass reinforced control sample to less than 1.1 inches per minute for similar samples containing various levels of aromatic halide and Group Vb metal containing compound within the preferred halide to Group Vb metal ratio range. In point of fact, when the halide to Group Vb metal is in the most preferred range, i.e., about 0.46 to about 2.0, the molded articles are rendered self-extinguishing.

It has been found, however, that this formulation, in a defined and limited set of circumstances, while sufficient to reduce the burning rate does not satisfactorily control dripping of flaming particles from the molded articles during the above described burn test. Subsequent investigation has disclosed that two sets of conditions must both be satisfied before the combined presence of an aromatic halide and a group Vb metal containing compound will be ineffectual in controlling burn-induced dripping of flaming particles of these molded articles. First, the molded article, or at least a section of the article must have a thickness less than about ⅛ inch. It will be understood for purposes of the present invention that what is meant by "thickness" is the smallest dimension of a three dimensional article. Second, the particle size of the reinforcing agent, as present in the molded article must have a length to diameter ratio of less than about 50:1. Stated again, an article molded of reinforced polypropylene terephthalate or reinforced polybutylene terephthalate, even though rendered self-extinguishing by the addition of preferred amounts and ratios of an aromatic halide and a group Vb metal containing compound, will none the less drip flaming particles during its albeit brief burning period, if it is less than about ⅛ inch in thickness and the particle size length to diameter ratio of the reinforcing agent, as present in the molded article, is less than about 50:1. That is, the molded article will not have reduced burning properties as defined herein.

Dripping of flaming particles from the test sample is considered for many comemrcial applications as serious and detrimental an impediment to utilization of the molding resin as a burn rate of greater than 1.1 inches per minute. For example, in electrical applications where the molding resin can be used as the support for integrated circuits or in automotive, under the hood applications if localized heating or overload should ignite the molded article, notwithstanding the fact that the presence of an aromatic halide and a group Vb metal containing compound in the blend composition will greatly reduce the burn rate and, if in the proper proportion, render the molded article self-extinguishing, any dripping, flaming particles could lead to unfortunate consequences.

It will be readily appreciated by those skilled in this art that many reinforcing agents, such as glass fibers, can and often do, undergo a sharp change in their length to diameter ratio during the procedures of blending with the molding resin and subsequent molding of the blended resin. While it is not completely understood, it is believed that in the case of the dual occurrence of a thin molded article and a resultant particle size length to diameter ratio of less than about 50:1 for the reinforcing agent, the particles of reinforcing agent are not able to maintain the structural integrity of the molded article during burning. Consequently, it is believed that as the flame approaches a section of molded article that section will collapse and the aromatic halide and group Vb metal containing compound in that section will be volatilized before they can interact to extinguish the flame, thereby resulting in dripping, flaming particles.

The present invention addresses itself to this problem and provides a solution which eliminates burn-induced dripping of flaming particles from relatively thin articles molded of reinforced polypropylene terephthalate or reinforced polybutylene terephthalate wherein the particle size length to diameter ratio of the reinforcing agent as present in the molded article, is below the critical limit. More particularly, the present invention provides reduced burning properties by incorporating into the molding resin of the present invention in addition to an aromatic halide and group Vb metal containing compound, a supplementary reinforcing agent which is capable of cooperating with the primary reinforcing agent to thereby maintain the structural integrity of the molded article during burning conditions. It will be understood for purposes of the present specification that the term "supplemental reinforcing agent" is intended to describe an additional reinforcing agent, i.e., in addition to that already in the intimate blend.

Supplementary reinforcing agents which are suitable for this function are materials having a particle size length to diameter ratio of at least 50:1 after blending with the molding resin and subsequent molding into an article. The supplementary reinforcing agent may be of any reasonable size within this ratio as long as it is capable of being formed, in conjunction with the polypropylene terephthalate or polybutylene terephthalate, into pellets of molding resin. More preferred supplemental reinforcing agent will have a length to diameter ratio of at least about 100:1 and a maximum diameter of about 0.002 inch. The most preferred embodiments for the supplementary reinforcing agent have a length to diameter ratio within the range of from about 150 to 500:1 and a maximum diameter of 0.002 inch after such processing and molding. The preferred supplementary reinforcing agents for purposes of the present invention are whisker materials having a length to diameter ratio from about 100 to about 5000, such as asbestos, graphite, glass, aluminum oxide, silicon carbide, silicon, tin and the like; the most preferred being asbestos.

Quite surprisingly, and as will be demonstrated more fully hereinafter, it has been found that relatively small amounts of the preferred supplementary reinforcing agents have an inordinate and disproportionate effect on these molded articles under burning conditions. For example it has been found that the addition of as little as 0.75 weight percent, based on the total weight of the composition is effective in eliminating dripping of flaming particles during burning. However, a more preferred minimum presence would be at least about 1.00 weight percent, so as to accommodate for any breakdown occurring during the dispersion of the supplementary reinforcing agents conforming to the above length to diameter ratio definition.

The following examples demonstrate without limiting the present invention, preparation of the reinforced polyalkylene terephthalate resins discussed herein and blending of these reinforced polyalkylene terephthalate resins with a supplemental reinforcing agent.

Example I 1200 grams of dimethyl terephthalate and 900 grams of 1,4 butanediol are mixed together along with an appropriate catalyst as described in the Whinfield and Dickson patent, U.S. 2,465,319, such as zinc acetate-antimony trioxide or lead oxide-zinc oxide. The temperature is increased to approximately 200° C. when 80 percent by weight of the methanol has been removed. Vacuum is applied and the temperature is raised to 240–250° C. When the intrinsic viscosity has reached 0.65 to 0.70 dl./g., vacuum is broken and 90 grams of tetrabromophthalic anhydride and 40 grams antimony trioxide are added under nitrogen. The mass is then mixed for 5 to 10 minutes and the resultant polymer discharged and chipped in the usual manner.

Example II

Fifteen pounds of polybutylene terephthalate were blended with an aromatic halide and a group Vb metal containing compound in the manner demonstrated in Example I, having an intrinsic viscosity of 0.82 was added to 6.9 pounds of ⅛ inch glass fibers and divided into two lots. The first lot was tumble mixed for one minute with 1.15 pounds of asbestos whisker material having a length to diameter ratio of about 200:1 and a maximum diameter of about 0.002 inch. The mixture was then heated to melt the polybutylene terephthalate and extrusion blended by force feeding through a single screw extruder with a strand die.

The second lot was similarly tumble mixed for one minute with 1.15 pounds of asbestos having a length to diameter ratio of about 45:1, heated to melt the polybutylene terephthalate and extrusion blended by force feeding through a single screw extruder with a strand die ranged from 500° to 510° F. and the extruded strands were ground in a milling type mixer to pass through a large screen (4 mesh or smaller).

Both lots were subsequently molded into 1/16 inch thick sample bars and burn tested in the above described manner. The results were as follows

| Lot | Weight percent asbestos | L/D | Average extinguishing time | | | | | |
|---|---|---|---|---|---|---|---|---|
| | | | As received | | | After 7 days at 70° C. | | |
| | | | First | Second | Dripped flames | First | Second | Dripped flames |
| 1 | 5 | ~200:1 | 0 | 0 | No | .4 | 1.5 | No. |
| 2 | 5 | ~45:1 | 0 | 0 | Yes | 1.6 | 2.9 | Yes. |

The following table demonstrates extinguishing times for several 1/16 inch thick sample bars molded of 30 weight percent glass reinforced polybutylene terephthalate containing 7 weight percent decabromodiphenyl oxide, 7 weight percent antimony trioxide and various amounts of asbestos whiskers having a length to diameter ratio of about 200:1 and a maximum diameter of about 0.002 inch as a supplementary reinforcing agent. The glass reinforcing agent in the samples was estimated to have a particle size length to diameter ratio of less than about 50:1. Comparative samples were tested both directly after molding and after aging for 7 days at 70° C. Each sample was ignited twice with a Bunsen burner flame according to the above described burning test.

TABLE I

| Percent of asbestos | As received, average ext. time (sec.) | | | After 7 days at 70° C., average ext. time (sec.) | | |
|---|---|---|---|---|---|---|
| | First | Second | Dripped flames | First | Second | Dripped flames |
| 0 | 0.2 | 3.4 | Yes | 14.0 | 1.0 | Yes. |
| 1 | 0.2 | 0.1 | No | 1.0 | 0.9 | No. |
| 2 | 0.1 | 0.0 | No | 0.9 | 0.5 | No. |
| 3 | 0.0 | 0.0 | No | 0.4 | 0.6 | No. |
| 4 | 0.0 | 0.0 | No | 0.5 | 0.5 | No. |
| 5 | 0.0 | 0.0 | No | 0.4 | 1.5 | No. |

As can readily be seen from this table, the presence of relatively small amounts of whiskers in the molding resin blend significantly and dramatically alters the tendency of thin articles molded of the resin, wherein the particle size length to diameter ratio of the reinforcing agent is less than about 100:1, to drip upon burning. Quite similar results will be found with reinforced polypropylene terephthalate and with other supplementary reinforcing agents fitting the above description. It will also be noted that not only is dripping eliminated, even after aging, but that extinguishing times are noticeably improved by the presence of this supplementary reinforcing agent.

Equally as important, since the acceptance and utilization of these molding resins, is to a large extent dependent upon their physical properties, the following table shows a substantial retention in physical properties of polybutylene terephthalate blended with 30 weight percent glass and containing 5 weight percent asbestos as compared to a 35 weight percent glass reinforced control sample.

TABLE II

| Property | PBT plus— | | | |
|---|---|---|---|---|
| | 30% glass | 40% glass | 35% glass | 30% glass plus 5% asbestos |
| Tensile strength break (p.s.i.) | 17,100 | 18,500 | 18,100 | 15,700 |
| Work energy brk. (in lbs.) | 80 | 63 | 78 | 54 |
| Percent elongation break | 1.5 | 1.5 | 1.4 | 1.3 |
| Flexural strength, p.s.i. break | 25,300 | 28,500 | 26,900 | 25,800 |
| Flexural modulus | $1.12 \times 10^6$ | $1.71 \times 10^6$ | $1.52 \times 10^6$ | $1.40 \times 10^6$ |
| Izod Impact, ft.-lbs./in. notch | 1.29 | 1.42 | 1.40 | 1.26 |
| Defl. temp. 264 p.s.i., °C | 201 | 204 | 198 | 195 |

As can be seen while there is a reduction in the tensile strength, and the upward trend of the tensile strength recorded at the 30%, 35% and 40% glass reinforced level and a somewhat similar occurrence in the work energy required for break, there is a substantial maintenance in flexural strength, flexural modulus, izod impact and deflection temperature. These very important retentions of physical properties in the areas of stiffness and toughness, etc. are of significant value in determining commercial acceptance of this improved molding resin.

This is especially so since the present invention is limited to molded articles less than ⅛ inch in thickness. That is, in articles of this order dimension, the critical properties are stiffness and toughness, and as can be seen, these have been maintained.

Very similar results are found with polypropylene terephthalate as the base resin.

In summary, the present invention alleviates the problem of dripping of flaming particles occurring during burning of relatively thin articles molded of reinforced polypropylene terephthalate or reinforced polybutylene terephthalate wherein the particle size length to diameter ratio of the reinforcing material, as present in the molded article is less than about 50:1. This desireable result is accomplished by incorporating into these molding resins, in addition to an aromatic halide and a group Vb metal containing compound, at least 0.75 weight percent, based on the weight of the total composition, of a supplementary reinforcing agent having a particle size length to diameter ratio of at least about 100:1. Preferred ranges of the present invention are from about 1 to about 15 weight percent, based on the total weight composition, of a supplementary reinforcing agent having a length to diameter ratio of at least 100:1 and a maximum diameter of about 0.002 inch; most preferably about 150–500:1 and a maximum diameter of 0.002 inch when present in the molded article.

As this invention may be embodied in several forms without departing from the spirit or essential character thereof, the present embodiments are illustrative and not restrictive. The scope of the invention is defined by the appended claims rather than by the description preceding them and all embodiments which fall within the meaning and range of equivalency of the claims are, therefore, intended to be embraced by those claims.

What is claimed is:

1. An improved molding resin having reduced burning properties when molded into articles wherein at least a portion thereof has a thickness of less than about ⅛ inch comprising an intimate blend of polyalkylene terephthalate selected from the group consisting of polypropylene terephthalate and polybutylene terephthalate, the polyalkylene terephthalate having an intrinsic viscosity in the range of from about 0.2 to about 1.2 deciliters per gram; a reinforcing agent comprised of particles having a length to diameter of less than about 50:1 when in the molded article; an aromatic halide stable at temperature necessary for melt processing of the polyalkylene terephthalate and capable of decomposing at combustion temperatures of the polyalkylene terephthalate; a Group Vb metal containing compound, wherein the weight ratio of available halide in the aromatic halide to the available Group Vb metal in the Group Vb metal containing compound ranges from about 0.3 to about 4; and, at least about 0.75 weight percent, based on the weight of the total composition of a supplemental reinforcing agent having a length to diameter ratio of greater than about 50:1 when in the molded article.

2. The improved molding resin of claim 1 wherein the reinforcing agent is present in the range of from about 2 to about 60 weight percent of the total composition; and, the supplemental reinforcing agent is comprised of particles having a length to diameter ratio of at least about 100:1 and a maximum diameter of 0.002 inch when in the molded article and the supplemental reinforcing agent is present in the blend in an amount of at least 1.0 weight percent based on the total composition.

3. The improved molding resin of claim 1 wherein the supplemental reinforcing agent has a length to diameter ratio of between about 150:1 to about 5000:1 and a maximum diameter of 0.002 inch when in the molded article and is present in the blend in an amount of at least 1.0 weight percent based on the total composition.

4. The improved molding resin of claim 3 wherein the halide in the aromatic halide is present in an amount from about 3.3 to about 16.6 weight percent, based on the weight of the resin; the group Vb metal containing compound is present in the range of from about 0.7 to about 10.0 weight percent, based on the weight of the resin; and, the ratio of available halide in the aromatic halide to the available group Vb metal in the group Vb metal containing compound ranges from about 0.46 to about 3.8.

5. The improved molding resin of claim 3 wherein the ratio of available halide in the aromatic halide to the available Group Vb metal in the Group Vb metal containing compound ranges from about 0.46 to about 2.

6. The improved resin of claim 3 wherein the Group Vb metal containing compound contains a metal selected from the group consisting of antimony, arsenic and bismuth.

7. The improved molding resin of claim 3 wherein the Group Vb metal containing compound contains antimony.

8. The improved molding resin of claim 3 wherein the Group Vb metal containing compound is selected from the group consisting of the oxides of arsenic, antimony and bismuth.

9. The improved molding resin of claim 3 wherein the Group Vb metal containing compound is antimony trioxide.

10. The improved molding resin of claim 3 wherein the aromatic halide is selected from the group consisting of (I)
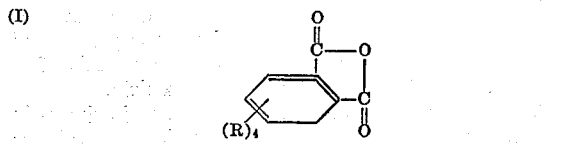

wherein at least one R represents: chlorine, bromine and the remaining R's represent: hydrogen, chlorine, bromine:

(II)
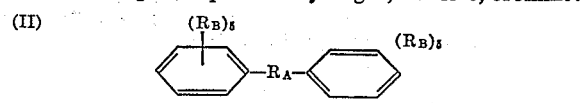

wherein $R_A$ represents: oxygen, sulfur, sulfur dioxide, methylene phosphonates, wherein at least one $R_B$ represents: chlorine, bromine, with the remaining $R_B$ representing: hydrogen, chlorine, bromine;

(III)
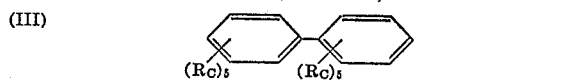

wherein at least one $R_C$ represents: chlorine, bromine, with the remaining $R_C$ representing: hydrogen, chlorine, bromine:

(IV)
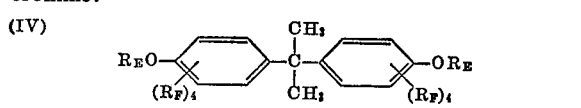

wherein each $R_E$ represents: hydrogen, acetate, methyl, wherein at least one $R_F$ represents: chlorine, bromine, with the remaining $R_F$ representing: hydrogen, chlorine, bromine.

11. The improved molding resin of claim 10 wherein the aromatic halide has at least two halides in the compound.

12. The improved molding resin of claim 11 wherein the aromatic halide is selected from the group consisting of tetrabromophthalic anhydride, tetrachlorophthalic anhydride, decarbromobiphenyl ether and decachlorobiphenyl ether.

13. The improved molding resin of claim 2 wherein the supplemental reinforcing agent is an asbestos whisker material having a length to diameter ratio between about 100:1 to about 5000:1.

14. The improved molding resin of claim 3 wherein the reinforcing agent is glass fiber present in an amount from about 5 to about 40 weight percent, based on the total composition; and, supplemental reinforcing agent comprises whisker asbestos fibers having an aspect ratio when in the molded article of between about 150:1 to about 500:1.

15. The improved molding resin of claim 3 wherein the polyalkylene terephthalate is polybutylene terephthalate.

16. The improved molding resin of claim 3 wherein the polyalkylene terephthalate is polypropylene terephthalate.

17. An improved molding resin having reduced burning properties when molded into articles wherein at least a portion thereof has a thickness of less than about 1/8 inch comprising an intimate blend of a polyalkylene terephthalate selected from the group consisting of polybutylene terephthalate and polypropylene terephthalate, having an intrinisc viscosity in the range of from about 0.2 to about 1.2 deciliters per gram; from about 5 to about 60 weight percent, based on the total composition, of glass reinforcing agent comprised of particles having a length to diameter ratio of less than about 100:1 when in the molded article; from about 3.3 to about 16.6 weight percent halide, based on the weight of the resin of an aromatic halide selected from the group consisting of tetrabromophthalic anhydride, tetrachlorophthalic anhydride, decabromobiphenyl ether and decachlorobiphenyl ether: from about 0.7 to about 10.0 weight percent metal, based on the weight of the resin, of antimony troxide, the ratio of available halide in the aromatic halide to available antimony in the antimony trioxide being greater than about 0.46 to about 4.0; and, from about 1.0 to about 50 weight percent, based on the weight of the total composition, of a supplemental whiskers reinforcing agent selected wherein the whiskers has a length to diameter ratio of at least about 150:1 when in the molded article.

18. The molding resin of claim 17 wherein the ratio of available halide in the aromatic halide to available antimony in the antimony trioxide ranges from about 0.46 to about 2; and, the length to diameter ratio of the supplemental reinforcing agent is between about 150:1 to about 500:1 when in the molded article.

19. The improved molding resin of claim 3 wherein the supplemental reinforcing agent is a glass whisker material having a length to diameter ratio between about 100:1 to about 5000:1.

20. The improved molding resin of claim 3 wherein the supplemental reinforcing agent is a graphite whisker material having a length to diameter ratio between about 100:1 to about 5000:1.

21. The improved molding resin of claim 3 wherein the supplemental reinforcing agent is a aluminum oxide whisker material having a length to diameter ratio between about 100:1 to about 5000:1.

22. The improved molding resin of claim 3 wherein the supplemental reinforcing agent is a silicon carbide whisker material having a length to diameter ratio between about 100:1 to about 5000:1.

23. The improved molding resin of claim 3 wherein the supplemental reinforcing agent is a silicon whisker material having a length to diameter ratio between about 100:1 to about 5000:1.

24. The improved molding resin of claim 3 wherein the supplemental agent is a tin whisker material having a length to diameter ratio between about 100:1 to about 5000:1.

References Cited

UNITED STATES PATENTS

| | | | |
|---|---|---|---|
| 3,487,349 | 12/1969 | Halloran | 260—40 R X |
| 3,424,727 | 1/1969 | Walker | 260—75 R |
| 3,471,437 | 10/1969 | Hume | 260—40 R |
| 3,516,957 | 6/1970 | Gray et al. | 260—40 R X |
| 3,624,024 | 11/1971 | Caldwell et al. | 260—40 R |

FOREIGN PATENTS

| | | | |
|---|---|---|---|
| 1,010,043 | 11/1965 | Great Britain | 260—40 R |

OTHER REFERENCES

J. Economy and L. Wokers: "The Potential of Whisker Reinforced Plastic," Plastics Design Processing, July 1967, pp. 31–4.

W. Sutton, B. Rosen and D. Flam: "Whisker-Reinforced Plastics for Space Applications," S.P.E. Journal, 20 (11) 1203-9 (1964).

MORRIS LIEBMAN, Primary Examiner

S. M. PERSON, Assistant Examiner

U.S. Cl. X.R.

260—DIG. 24